(12) United States Patent
Chiu et al.

(10) Patent No.: US 11,212,093 B2
(45) Date of Patent: Dec. 28, 2021

(54) METHOD OF SOCIAL KEY RECOVERY AND RELATED DEVICE

(71) Applicant: HTC Corporation, Taoyuan (TW)

(72) Inventors: Hsien-Chun Chiu, Taoyuan (TW); I-Hui Lu, Taoyuan (TW); Cheng-Chang Tsai, Taoyuan (TW); Ting-Hung Chu, Taoyuan (TW); Chun-Hao Lin, Taoyuan (TW); Han-Kuan Yu, Taoyuan (TW); Chang-Yi Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 356 days.

(21) Appl. No.: 16/566,900

(22) Filed: Sep. 11, 2019

(65) Prior Publication Data

US 2020/0092097 A1    Mar. 19, 2020

Related U.S. Application Data

(60) Provisional application No. 62/731,102, filed on Sep. 14, 2018.

(51) Int. Cl.
  *H04L 9/08* (2006.01)
  *H04L 9/32* (2006.01)
  (Continued)

(52) U.S. Cl.
  CPC ............ *H04L 9/0894* (2013.01); *G06F 21/72* (2013.01); *G06Q 20/16* (2013.01); *G06Q 20/3678* (2013.01); *G06Q 20/389* (2013.01); *G06Q 20/3829* (2013.01); *H04L 9/0637* (2013.01); *H04L 9/085* (2013.01); *H04L 9/30* (2013.01); *H04L 9/3226* (2013.01); *H04L 63/0853* (2013.01); *H04L 63/0876* (2013.01);
  (Continued)

(58) Field of Classification Search
  CPC ..... H04L 9/0894; H04L 9/085; H04L 9/3226; H04L 63/0853; H04L 63/0876; H04L 2209/38; G06Q 20/3829
  See application file for complete search history.

(56) References Cited

U.S. PATENT DOCUMENTS

2016/0140335 A1* 5/2016 Proulx ................. H04L 63/083
                                                              726/6
2018/0375653 A1* 12/2018 Setty .................... H04L 63/062
(Continued)

*Primary Examiner* — David J Pearson
(74) *Attorney, Agent, or Firm* — Winston Hsu

(57) ABSTRACT

A method of social key recovery for a first communication device supporting blockchain technology with asymmetric cryptographic algorithm is disclosed. The method comprises transmitting a device identity of the first communication to a second communication on the blockchain, performing a verification operation with the second communication device, receiving a message including a verification code of the first communication device and a public key of the second communication device, from the second communication device, wherein the first message is encrypted with a public key of the first communication device, decrypting the message with a private key of the first communication device, to obtain the public key of the second communication device, and transmitting seed phrases encrypted with the public key of the second communication device for restoring a crypto wallet on the blockchain, to the second communication device.

21 Claims, 5 Drawing Sheets

(51) Int. Cl.
*H04L 9/30* (2006.01)
*H04L 9/06* (2006.01)
*H04L 29/06* (2006.01)
*G06Q 20/36* (2012.01)
*G06Q 20/38* (2012.01)
*G06Q 20/16* (2012.01)
*G06F 21/72* (2013.01)

(52) U.S. Cl.
CPC ...... *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 2019/0007205 A1* | 1/2019 | Corduan | G06Q 20/367 |
| 2019/0034920 A1* | 1/2019 | Nolan | H04L 9/0894 |
| 2019/0342084 A1* | 11/2019 | Mehedy | H04L 9/0643 |
| 2020/0008251 A1* | 1/2020 | Cheung | H04W 12/02 |
| 2020/0382953 A1* | 12/2020 | Li | G06K 7/10257 |

* cited by examiner

METHOD OF SOCIAL KEY RECOVERY AND RELATED DEVICE

CROSS REFERENCE TO RELATED APPLICATIONS

This application claims the benefit of U.S. Provisional Application No. 62/731,102, filed on Sep. 14, 2018 and entitled "Wallet embedded in Key Management & Key Management—Social Backup Functional Specification", the contents of which are incorporated herein in their entirety.

BACKGROUND OF THE INVENTION

1. Field of the Invention

The present invention relates to a method of key management and related device, and more particularly, to a method of social key recovery and related device.

2. Description of the Prior Art

Social key recovery aims to provide an alternative and interesting way to help user backup cryptocurrency seed phrases for access his/her crypto wallet on the blockchain. Currently user needs manually to write down all his/her seed phrases on a piece of paper and locks it in a safe, which is troublesome to user. To solve user's pain in backup, conventional key management tries to propose a social way to help user backup their seed phrases. The idea aims at dividing the seed phrases into several pieces and sends to few trusted friends. Each friend gets a piece of the seed phrase, e.g., ⅓, so it's very hard for the hacker to recover it with any single piece. Moreover, with the key sharing mechanism, user can restore his/her seed phrases from only partial of the backups, e.g., user would just need to collect seed phrase from 3 friends when he/she sent to 5 friends. Therefore, the cryptocurrency seed phrases are still recoverable even some friends are missing backups. In a word, with social key recovery mechanism, if the user loses his/her mobile phone, the user still can restore the crypto wallet on his/her new mobile phone with the shared seed phrases.

However, there is no specification for social key recovery mechanism, which may cause insecure seed phrase sharing and endanger the crypto wallet (i.e. losing Bitcoin/Ethereum).

SUMMARY OF THE INVENTION

It is therefore an objective to provide a method of social key recovery and related device to solve the above problem.

The present invention discloses a method of social key recovery for a first communication device supporting blockchain technology with asymmetric cryptographic algorithm. The method comprises transmitting a device identity of the first communication to a second communication on the blockchain, receiving a request for a verification code of the first communication device, from the second communication device, in response to the request, transmitting the verification code of the first communication device, to the second communication device, receiving a first message including the verification code of the first communication device and a public key of the second communication device, from the second communication device, wherein the first message is encrypted with a public key of the first communication device, decrypting the first message with a private key of the first communication device, to obtain the public key of the second communication device, and transmitting seed phrases encrypted with the public key of the second communication device for restoring a crypto wallet on the blockchain, to the second communication device.

The present invention further discloses a method of social key recovery for a second communication device supporting blockchain technology with asymmetric cryptographic algorithm. The method comprises receiving a device identity of a first communication device, from the first communication device on the blockchain, requesting the first communication device of a verification code, receiving the verification code from the first communication device, in response to the receiving of the verification code of the first communication device, generating a pair of a public key and a private key of the second communication device, utilizing the device identity to request a key server on the blockchain to encrypt the received verification code and the public key of the second communication device in a message with a public key of the first communication device, wherein the public key is pre-stored in the key server based on the device identity, receiving the encrypted message from the key server, transmitting the encrypted message including the verification code of the first communication device and the public key of the second communication device, to the first communication device, and receiving seed phrases encrypted with the public key of the second communication device, from a first communication device.

The present invention further discloses a first communication device for social key recovery, the first communication device supporting blockchain technology with asymmetric cryptographic algorithm. The first communication device comprises a processing circuit, for executing a program code, and a storage device, coupled to the processing circuit, for storing the program code, wherein the program code instructs the processing circuit to perform the following steps: transmitting a device identity of the first communication to a second communication on the blockchain, receiving a request for a verification code of the first communication device, from the second communication device, in response to the request, transmitting the verification code of the first communication device, to the second communication device, receiving a first message including the verification code and a public key of the second communication device, from the second communication device, wherein the first message is encrypted with a public key of the first communication device, decrypting the first message with a private key of the first communication device, to obtain the public key of the second communication device, and transmitting seed phrases encrypted with the public key of the second communication device for restoring a crypto wallet on the blockchain, to the second communication device.

The present invention further discloses a second communication device for social key recovery, the second communication device supporting blockchain technology with asymmetric cryptographic algorithm. The second communication device comprises a processing circuit, for executing a program code, and a storage device, coupled to the processing circuit, for storing the program code, wherein the program code instructs the processing circuit to perform the following steps: receiving a device identity of a first communication device, from the first communication device on the blockchain, requesting the first communication device of a verification code, receiving the verification code from the first communication device, in response to the receiving of the verification code of the first communication device, generating a pair of a public key and a private key of the second communication device, utilizing the device identity to request a key server on the blockchain to encrypt the received verification code and the public key of the second communication device in a message with a public key of the first communication device, wherein the public key is pre-stored in the key server based on the device identity, receiving the encrypted message from the key server, transmitting the encrypted message including the verification code of the first communication device and the public key of the second communication device, to the first communication device, and receiving seed phrases encrypted with the public key of the second communication device, from a first communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
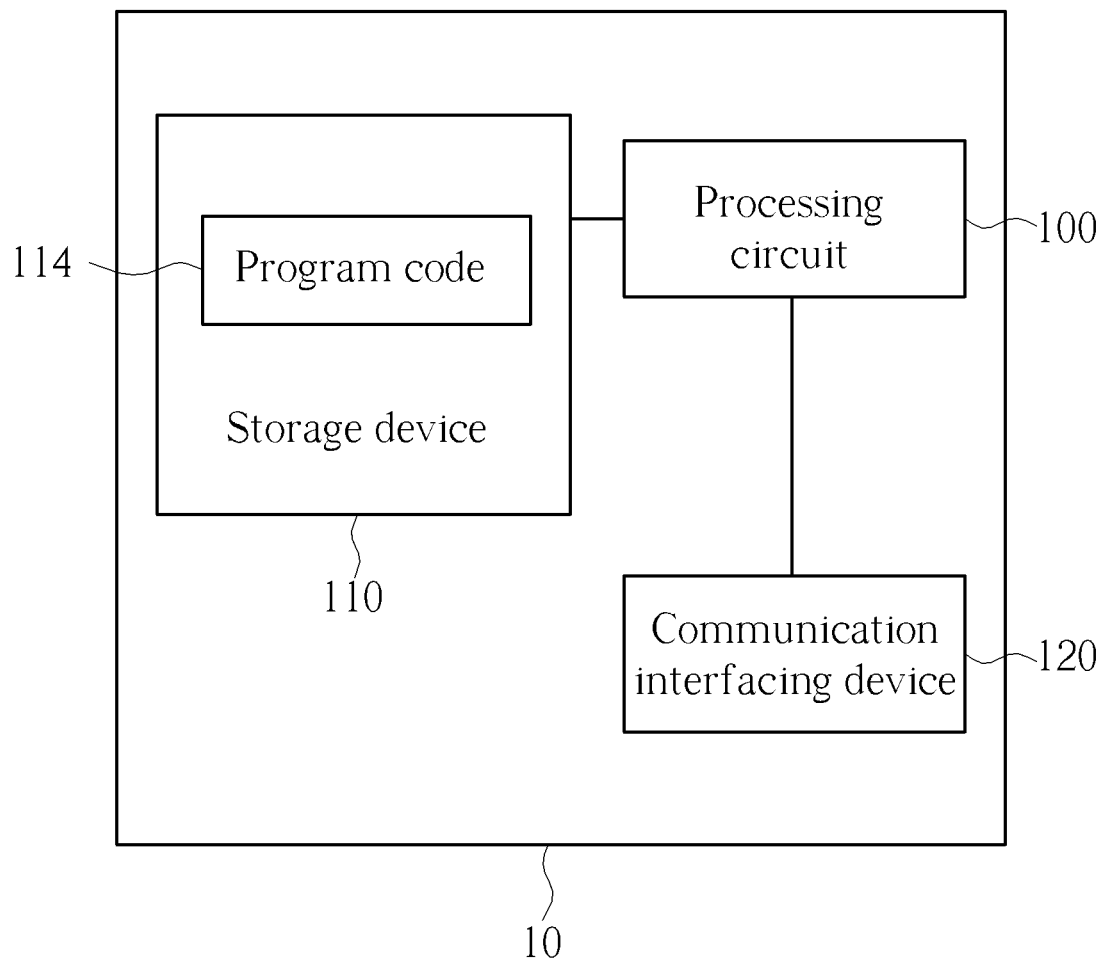
FIG. 1 is a schematic diagram of a communication device according to an embodiment of the present disclosure.

FIG. 1 is a schematic diagram of the communication device 10 according to one embodiment of the present disclosure. The communication device 10 may be a smart phone, a cellular phone, a personal digital assistant (PDA), a laptop, a media player, a global positioning system (GPS), or other mobile or non-mobile computing devices, but may not be restricted thereto. The communication device 10 includes a processing circuit 100, such as a Central Processing Unit (CPU) and a microprocessor or Application Specific Integrated Circuit (ASIC), a storage device 110 and a communication interfacing device 120. The storage device 110 may be any data storage device that can store a program code 114, for access by the processing circuit 100. Examples of the storage device 110 include but are not limited to a subscriber identity module (SIM), read-only memory (ROM), flash memory, random-access memory (RAM), CD-ROMs, magnetic tape, hard disk, and optical data storage device. The communication interfacing device 120 could be a wireless transceiver for exchange signals with other communication devices.

The communication device 10 supports blockchain and trust zone technologies. Blockchain involves asymmetric cryptography algorithm (e.g. RSA key pair). The asymmetric cryptography is known as public and private key encryption, where public key encrypted content is decrypted only with private key and private key encrypted content is decrypted only with public key. On the other hand, trust zone concept is applied to mobile processors (APs) to operate sensitive information and applications such as payments, certificates, and company confidential information stored in the communication device 10 without exposing them to external attacks. Note that, trust zone runs directly on the hardware and manages processing device 100 by dividing it into two virtual spaces: the normal world and the secure world. Operations that do not require security are run in the normal area, and operations that require security are run in the secure area. Therefore, trust zone may protect a processor circuit and memory of the communication device 30 from software attack. Trust zone is well known as a trusted execution environment (TEE), which is a secure area of a processor. It guarantees code and data loaded inside to be protected with respect to confidentiality and integrity. In this article, trust zone of the communication device 10 stores a device identity and a private key, while a key server (now shown) on the blockchain maintains a public key of the communication device 30 based on the device identity.

Figure 2:
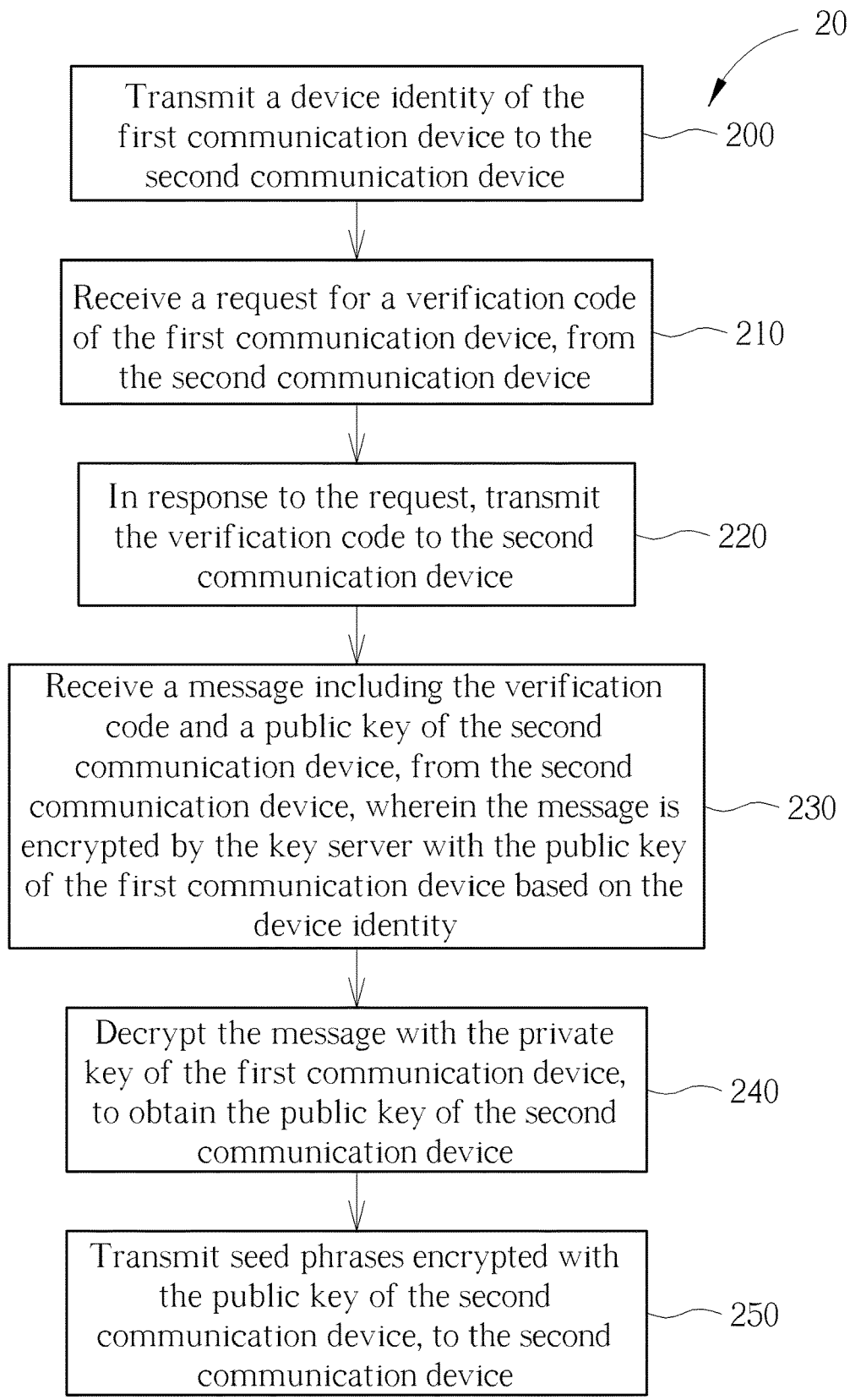
FIG. 2 is a flowchart of social key recovery according to an embodiment of the present disclosure.

Reference is made to FIG. 2. A flowchart of the social key recovery process 20 is illustrated. The social key recovery process 20 could be utilized in the communication device 10 (hereafter called the first communication device) to backup keys (i.e. seed phrases) on other communication devices (hereafter called the second communication device) for restoring crypto wallet on blockchain. The social key recovery process 20 may be compiled into a program code 114, and includes the following steps:

Step 200: Transmit a device identity of the first communication device to the second communication device.

Step 210: Receive a request for a verification code of the first communication device, from the second communication device.

Step 220: In response to the request, transmit the verification code to the second communication device.

Step 230: Receive a message including the verification code and a public key of the second communication device, from the second communication device, wherein the message is encrypted by the key server with the public key of the first communication device based on the device identity.

Step 240: Decrypt the message with the private key of the first communication device, to obtain the public key of the second communication device.

Step 250: Transmit seed phrases encrypted with the public key of the second communication device, to the second communication device.

According to the social key recovery process 20, the present invention proposes that the first communication device transmits the device identity to the second communication device, wherein the device identity is pre-stored in the trust zone of the first communication device for security, and the second communication device can apply the device identity of the first communication device to request the key server to encrypt the public key of the second communication device with the public key of the first communication device. Thus, the first communication device could decrypt and obtain the public key of the second communication with the private key of the first communication device, and therefore encrypts the seed phrases for crypto wallet with the public key of the second communication device. The encrypted seed phrases received by the second communication device can be successfully decrypted only with the private key of the second communication device, so as to secure the backup key operation. With such manner (i.e. verification and key server encryption), other communication devices or hackers cannot decrypt the seed phrases for restoring the crypto wallet.

In addition, for restoring the crypto wallet, the first communication device first performs the verification operation with the second communication device, wherein the verification operation includes steps of requesting verification code form the second communication device and receiving the verification code from the second communication device. After the verification operation is successfully performed, the first communication device encrypts the verification code of the second communication device with the private key of the first communication device. The second communication device utilizes the device identity to request the key server to decrypt the verification code of the second communication device for authentication and to encrypt the previously backup seed phrases with the public key of the first communication device. Therefore, the first communication device can decrypted the seed phrases with the private key of the first communication device, so as to obtain seed phrases for restoring the crypto wallet. In an embodiment, the first communication device shall collect seed phrases from at least 3 friends of their communication devices, so as to completely the crypto wallet recovery.

Figure 3:
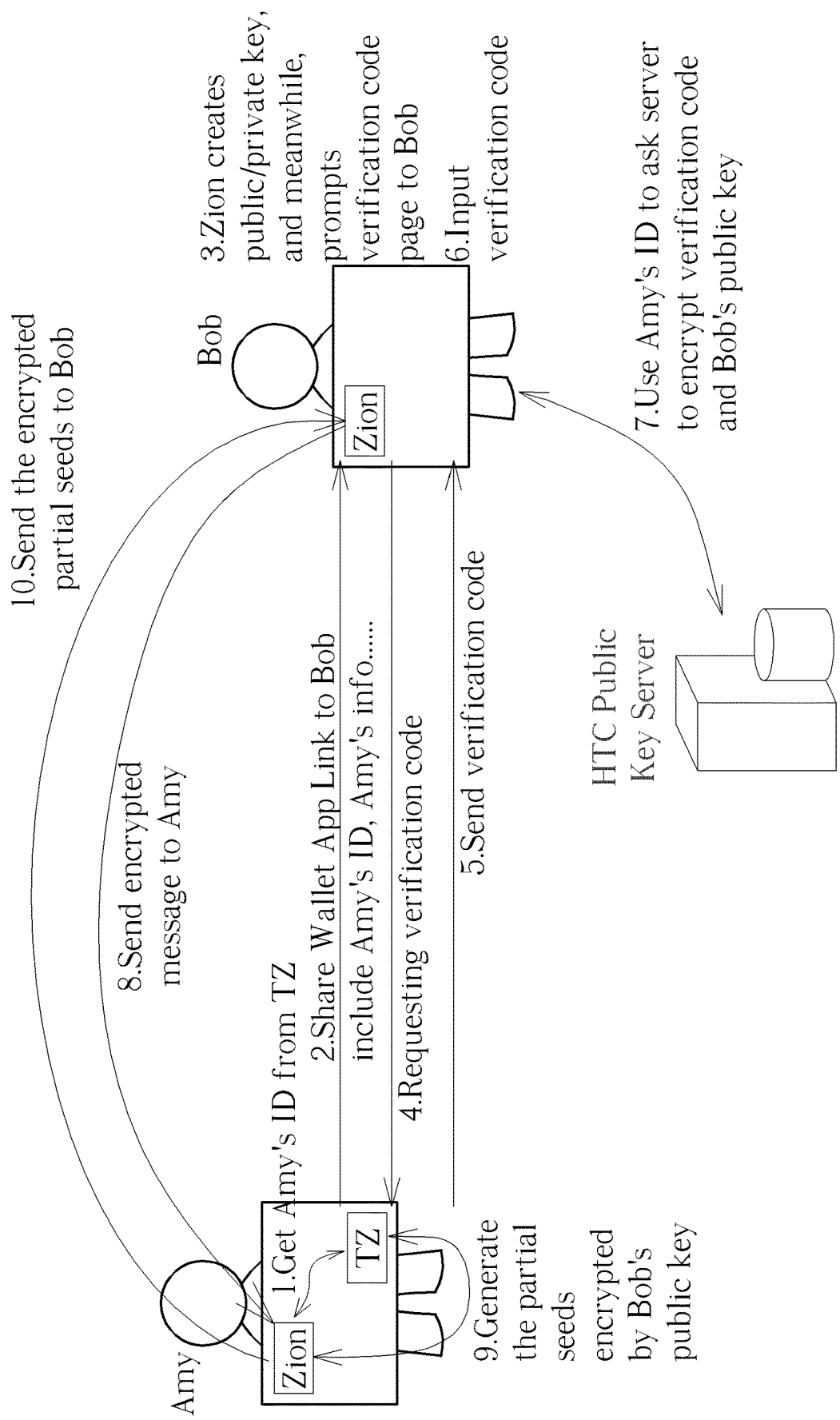
FIG. 3 is a schematic diagram of a social key recovery operation according to an embodiment of the present disclosure.

For detailed social key recovery operation between two communication devices (e.g. mobile phones), reference is made to FIG. 3. A user "Amy" wants to back up her social key (i.e. partial seed phrases) for crypto wallet to her friend "Bob". Amy's phone could be an Android phone or iPhone and is installed of a hardware-backed key management platform/application (e.g. HTC Zion Vault), which is operated on the trust zone for social key recovery implement in the secure area of the processor (e.g. the processing circuit 100) of the mobile phone, and thus the backup key operation will not be accessed by Android or iOS or any other software. In other words, the hardware-backed key management platform/application, namely "Zion" shown in FIG. 3, is operated in a safe environment for social key backup, and thus runs free from malware. In other words, "Zion" is used as a sophisticated combination of hardware and software to increase the security of crypto assets. For example, "Zion" allows users to perform crypto transactions, view and manage their cryptocurrencies and collectibles. In addition, "Zion" breaks, encrypts and shares seed phrases to trust contacts and can help the user to recover social key when the user's phone is lost.

In an embodiment, the message from the Amy's mobile phone to the Bob's mobile phone may be transmitted by a firebase dynamic link with Firebase Cloud Messaging (FCM), where users (i.e. Amy's phone) shall register to the Google Cloud for uses these services. In FIG. 3, "Zion" of Amy's phone obtains the identity of Amy's phone from trust zone TZ (step 1), and transmits the identity of Amy's phone to "Zion" of Bob's phone via an APP link created by the firebase dynamic link of the FCM (step 2). Then, "Zion" of Bob's phone creates the public key and the private key (step 3), and requests the verification code from Amy (step 4). Thus, Amy transmits the verification code to the Bob for authentication (steps 5-6). In an embodiment, the authentication may applied with 3rd party online identify verification service, such as Google Cloud. Meanwhile, Bob uses the identity of Amy's phone to ask the key server to encrypt the received verification code and the public key of Bob's phone (step 7). Note that, the key server (e.g. HTC public key server shown in FIG. 3) stores public key for the phones installed of "Zion" APP based on the identity of the phone. Bob sends the encrypted verification code and the public key of Bob's phone to Amy's phone (step 8). With such manner, Amy could decrypt and obtain the verification code and public key of Bob's phone with her private key, and then generates partial seed phrase for sharing if the verification code is conformed to the verification code transmitted to Bob, and therefore encrypts the partial seed phrase with Bob's public key (step 9). Finally, Amy sends the encrypted partial seed phrase to Bob (step 10), which could be decrypted only by the private key of Bob, so as to realize secure social key recovery operation.

Figure 4:
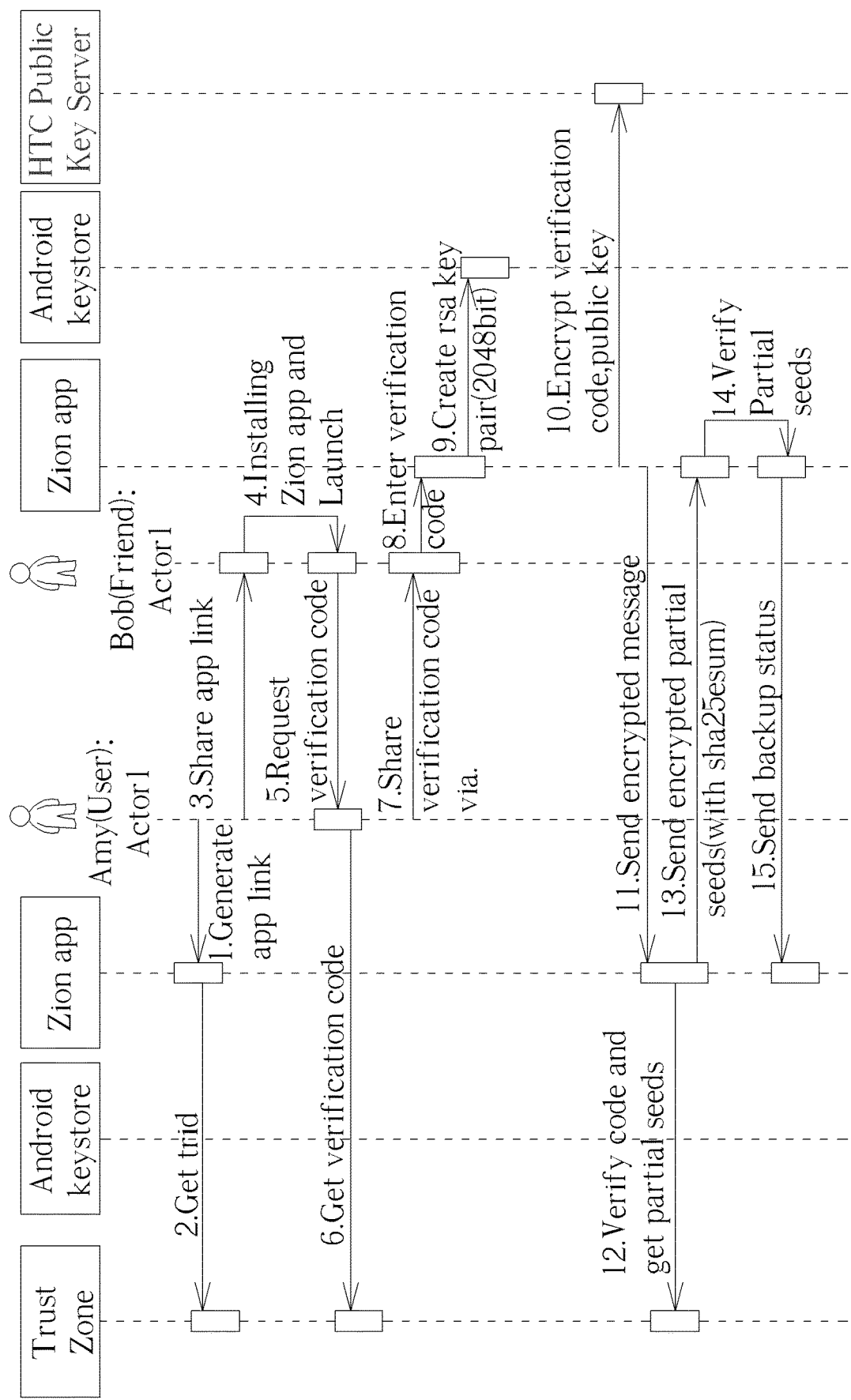
FIG. 4 is a schematic diagram of a message sequence of backup key according to an embodiment of the present disclosure.

Reference is made to FIG. 4 for more details of backup key operation, which may include the following steps:

1. Amy launches Zion APP and creates app link (e.g. Firebase Dynamic Links) to share.

2. Zion APP gets the device identity (tzid) from Trust Zone. The device identity (tzid) is used to query the public key of Amy' phone on HTC Public Key Server. Note that, HTC Public Key Server stores public key of each device. In addition, the data encrypted with this specific device's public key can only be decrypted by the Trust Zone on this device.

3. Amy shares app link to her friend Bob with a messaging app, e.g; Line, Whatsapp, Email . . . etc. App link includes a Hashed Universally Unique Identifier (hash_uuid), Firebase Cloud Messaging Token (fcm_token), the device identity (tzid) and other user information, such as name, phone number, phone model . . . , etc.

4. Bob installs Zion app from the app link and launches Zion app to entering a verification code page.

5. When Bob requests verification code from Amy, his Firebase Cloud Messaging Token (fcm_token) is also sent to Amy to establish a FCM connection between Amy and Bob.

6. Amy gets verification code request and generates the verification code for Bob, which is displayed via secure UI in Trust Zone (Amy will need to enter a passcode).

7. Amy sends the verification code to Bob with the messaging app or phone call (i.e. second channel).

8. Bob inputs the verification code in Zion app.

9. Bob's Zion app creates an RSA key pair (namely public key and private key).

10. Bob's Zion app uses the device identity tzid (from step 3) to ask the HTC Public key server to encrypt the verification code (from step 7) and public key (from step 9).

11. Bob's Zion app sends the encrypted message (from step 10) to Amy's Zion app.

12. Amy's Zion app receives the encrypted message and passes to Trust Zone to verify. If the verification code (from step 6) matches to the verification code transmitted to Bob, Amy then returns the partial seed phrases encrypted with Bob's public key.

13. Amy's Zion app sends the encrypted partial seed phrases to Bob.

14. Bob's Zion app receives the encrypted partial seed phrases and verifies the integrity.

15. Bob's Zion app routinely sends backup status to Amy's Zion app.

Figure 5:
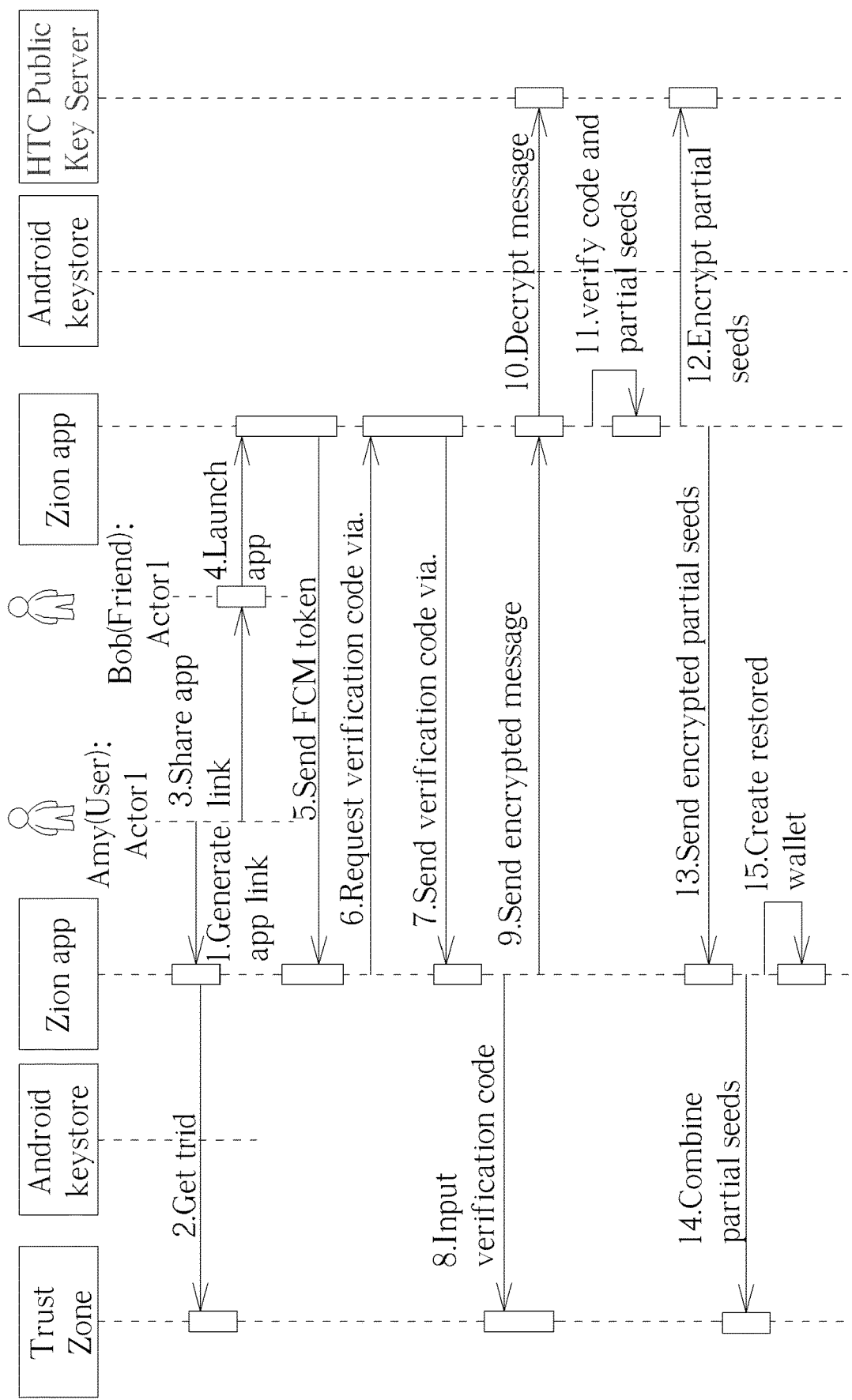
FIG. 5 is a schematic diagram of a message sequence of restore key according to an embodiment of the present disclosure.

Reference is made to FIG. 5 for restoring key operation, which includes the following steps:

1. Amy creates app link to share.

2. Zion app of Amy gets the device identity (tzid) from Trust Zone.

3. Amy shares app link to Bob and other friends via the messaging app. App link may include the Hashed Universally Unique Identifier (hash_uuid), the Firebase Cloud Messaging Token (fcm_token), the device identity (tzid) and other user information.

4. Bob clicks the app link and launches Zion app.

5. Bob's Zion app sends the Firebase Cloud Messaging Token (f cm token) to Amy to establish the FCM connection.

6. Bob's Zion app generates a random verification code from app link.

7. Bob sends the verification code to Amy with the messaging app (i.e. second channel).

8. Amy inputs the verification code in secure UI of Trust Zone. Verification code is encrypted with the private key of Amy.

9. Amy's Zion app sends the encrypted message (from step 8) to Bob.

10. Bob's Zion app asks HTC Public Key Server to decrypt the message with public key of Amy, and verifies the verification code (from step 6).

11. After the verification code is verified, Bob's Zion app decrypted the partial seed phrases, which is encrypted with public key of Bob.

12. Bob's Zion app uses the device identity (tzid) (from step 2) to ask HTC Public Key Server to encrypt the partial seed phrases.

13. Bob's Zion app sends the encrypted partial seed phrases to Amy.

14. After Amy collects 3 friends' partial seed phrases, she can proceed to combine these seed phrases.

15. After seed phrases are combined, the crypto wallet is therefore restored.

In other embodiments, the abovementioned social key could be back up to not only friends, but also network server and other online strongbox provider, e.g., bank.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 10.

In conclusion, the present invention addresses to social key recovery with trust zone and key server. In detail, the trust zone includes the device identity for requesting the key server to encrypt or decrypt messages. Thus, the seed phrases in the message will not be modified or decrypted by the hacker, operation system (e.g. Android/iOS) or any other software without the device identity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of social key recovery for a first communication device supporting blockchain technology with asymmetric cryptographic algorithm, the method comprising:
   transmitting a device identity of the first communication device to a second communication device on the blockchain;
   receiving a request for a verification code of the first communication device, from the second communication device;
   in response to the request, transmitting the verification code of the first communication device, to the second communication device;
   receiving a first message including the verification code of the first communication device and a public key of the second communication device, from the second communication device, wherein the first message is encrypted with a public key of the first communication device;
   decrypting the first message with a private key of the first communication device, to obtain the public key of the second communication device; and
   transmitting seed phrases encrypted with the public key of the second communication device for restoring a crypto wallet on the blockchain, to the second communication device.

2. The method of claim 1, wherein the device identity is pre-stored in and obtained from a trust zone of the first communication device, and the trust zone is a secure area of a processor of the first communication device.

3. The method of claim 1, wherein the public key of the first communication device is pre-stored in a key server on the blockchain based on the device identity.

4. The method of claim 2, wherein decrypting the first message with the private key of the first communication device comprises:
   in the trust zone, decrypting the first message with the private key of the first communication device, to obtain the verification code of the first communication device and the public key of the second communication device.

5. The method of claim 4, further comprising:
   in the trust zone, determining whether the obtained verification code is matched to the verification code transmitted to the second communication device;
   wherein transmitting the seed phrases encrypted with the public key of the second communication device, to the second communication device comprises:
      transmitting the seed phrases encrypted with the public key of the second communication device, to the second communication device when determining the obtained verification code is matched to the verification code transmitted to the second communication device.

6. The method of claim 1, wherein transmitting the device identity of the first communication to the second communication device on the blockchain comprises:
   transmitting a message including the device identity and at least one of universally unique identifier with a hash function, firebase cloud messaging token, user information, phone number and phone model of the first communication device, to the second communication device.

7. The method of claim 1, further comprising:
   receiving a backup status for indicating success or failure of the seed phrases backup, from the second communication device.

8. The method of claim 2, further comprising:
   requesting the second communication device of a verification code;
   receiving the verification code from the second communication device;
   in the trust zone, encrypting the verification code of the second communication device with the private key of the first communication device;
   transmitting the encrypted verification code of the second communication device, to the second communication device;
   receiving the seed phrases encrypted with the public key of the first communication device pre-stored in a key server on the blockchain based on the device identity, from the second communication device; and
   decrypting the seed phrases with the private key of the first communication device for restoring a crypto wallet on the blockchain.

9. A method of social key recovery for a second communication device supporting blockchain technology with asymmetric cryptographic algorithm, the method comprising:

receiving a device identity of a first communication device, from the first communication device on the blockchain;

requesting the first communication device of a verification code;

receiving the verification code from the first communication device;

in response to the receiving of the verification code of the first communication device, generating a pair of a public key and a private key of the second communication device;

utilizing the device identity to request a key server on the blockchain to encrypt the received verification code and the public key of the second communication device in a message with a public key of the first communication device, wherein the public key is pre-stored in the key server based on the device identity;

receiving the encrypted message from the key server;

transmitting the encrypted message including the verification code of the first communication device and the public key of the second communication device, to the first communication device; and receiving seed phrases encrypted with the public key of the second communication device, from a first communication device.

10. The method of claim 9, further comprising:

transmitting a backup status for indicating success or failure of the seed phrases backup, to the first communication device.

11. The method of claim 9, further comprising:

receiving a request for a verification code of the second communication device, from the first communication device;

transmitting the verification code of the second communication device to the first communication device;

receiving a first message including the verification code of the second communication device and encrypted by a private key of the first communication device, from the first communication device;

utilizing the device identity to request the key server to decrypted the first message with the public key of the first communication device, to obtain the verification code of the second communication device;

when the obtained verification code is conformed to the verification code transmitted to the first communication device, decrypting the seed phrases with the private key of the second communication device;

utilizing the device identity to request the key server to encrypt the seed phrases with the public key of the first communication device; and transmitting the encrypted seed phrases to the first communication device.

12. A first communication device for social key recovery, the first communication device supporting blockchain technology with asymmetric cryptographic algorithm and comprising:

a processing circuit, for executing a program code; and a storage device, coupled to the processing circuit, for storing the program code, wherein the program code instructs the processing circuit to perform the following steps:

transmitting a device identity of the first communication device to a second communication device on the blockchain;

receiving a request for a verification code of the first communication device, from the second communication device;

in response to the request, transmitting the verification code of the first communication device, to the second communication device;

receiving a first message including the verification code and a public key of the second communication device, from the second communication device, wherein the first message is encrypted with a public key of the first communication device;

decrypting the first message with a private key of the first communication device, to obtain the public key of the second communication device; and transmitting seed phrases encrypted with the public key of the second communication device for restoring a crypto wallet on the blockchain, to the second communication device.

13. The first communication device of claim 12, wherein the device identity is pre-stored in and obtained from a trust zone of the processing circuit.

14. The first communication device of claim 13, wherein the program code further instructs the processing circuit to perform the following steps:

in the trust zone, decrypting the first message with the private key of the first communication device, to obtain the verification code of the first communication device and the public key of the second communication device.

15. The first communication device of claim 14, wherein the program code further instructs the processing circuit to perform the following steps:

in the trust zone, determining whether the obtained verification code is matched to the verification code transmitted to the second communication device; and transmitting the seed phrases encrypted with the public key of the second communication device, to the second communication device when determining the obtained verification code is matched to the verification code transmitted to the second communication device.

16. The first communication device of claim 12, wherein the program code further instructs the processing circuit to perform the following steps:

transmitting a message including the device identity and at least one of universally unique identifier with a hash function, firebase cloud messaging token, user information, phone number and phone model of the first communication device, to the second communication device.

17. The first communication device of claim 12, wherein the program code further instructs the processing circuit to perform the following steps: receiving a backup status for indicating success or failure of the seed phrases backup, from the second communication device.

18. The first communication device of claim 13, wherein the program code further instructs the processing circuit to perform the following steps:

requesting the second communication device of a verification code;

receiving the verification code from the second communication device;

in the trust zone, encrypting the verification code of the second communication device with the private key of the first communication device;

transmitting the encrypted verification code to the second communication device;

receiving the seed phrases encrypted with the public key of the first communication device pre-stored in a key server on the blockchain based on the device identity, from the second communication device; and decrypting the seed phrases with the private key of the first communication device for restoring a crypto wallet on the blockchain.

19. A second communication device for social key recovery, the second communication device supporting blockchain technology with asymmetric cryptographic algorithm and comprising:

a processing circuit, for executing a program code; and a storage device, coupled to the processing circuit, for storing the program code, wherein the program code instructs the processing circuit to perform the following steps:

receiving a device identity of a first communication device, from the first communication device on the blockchain;

requesting the first communication device of a verification code;

receiving the verification code from the first communication device;

in response to the receiving of the verification code of the first communication device, generating a pair of a public key and a private key of the second communication device;

utilizing the device identity to request a key server on the blockchain to encrypt the received verification code and the public key of the second communication device in a message with a public key of the first communication device, wherein the public key is pre-stored in the key server based on the device identity;

receiving the encrypted message from the key server;

transmitting the encrypted message including the verification code of the first communication device and the public key of the second communication device, to the first communication device; and receiving seed phrases encrypted with the public key of the second communication device, from a first communication device.

20. The second communication device of claim 19, wherein the program code further instructs the processing circuit to perform the following steps:

transmitting a backup status for indicating success or failure of the seed phrases backup, to the first communication device.

21. The second communication device of claim 19, wherein the program code further instructs the processing circuit to perform the following steps:

receiving a request for a verification code of the second communication device, from the first communication device;

transmitting the verification code of the second communication device, to the first communication device;

receiving a first message including the verification code of the second communication device and encrypted by a private key of the first communication device, from the first communication device;

utilizing the device identity to request the key server to decrypted the first message with the public key of the first communication device, to obtain the verification code of the second communication device;

when the obtained verification code is conformed to the verification code transmitted to the first communication device, decrypting the seed phrases with the private key of the second communication device;

utilizing the device identity to request the key server to encrypt the seed phrases with the public key of the first communication device; and transmitting the encrypted seed phrases to the first communication device.

* * * * *